Patented Oct. 2, 1951

2,570,136

UNITED STATES PATENT OFFICE 2,570,136

INFRARED PHOSPHORS

Donald W. Lyon, Wilmington, Del., assignor to E. I. du Pont de Nemours and Company, Wilmington, Del., a corporation of Delaware No Drawing. Application December 22, 1949, Serial No. 134,601

9 Claims. (Cl. 252—301.4)

This invention relates to the manufacture of phosphorescent pigments, and more particularly to new infrared-stimulable phosphors.

Previously-developed infrared phosphors, such as zinc sulphide and the sulphide or selenide of strontium suitably activated and excited, have a relatively strong and persistent emission when irradiated with infrared energy. However, for certain applications, such known phosphors are too strongly phosphorescent and store energy for too extensive a period of time. Such applications require compounds of relatively weaker and yet adequate infrared phosphorescence, and of lesser ability to store excited energy. It is among the objects of this invention to fulfill this need and to meet such presently-desired specifications. A particular object is to prepare infrared phosphors which emit light, during infrared stimulation, which is less strong than that of conventional zinc sulphide or alkaline earth sulphide or selenide phosphors, and which have a more limited storage of excited energy. Other objects and advantages of the invention will be apparent from the ensuing description thereof.

These and other objects are realized by this invention which broadly comprises preparing an oxidic compound or double oxide of calcium with at least one element adapted to form a white, acidic oxide selected from the group consisting of aluminum, molybdenum, silicon, tin, titanium and vanadium, and activating such oxidic compound with a copper activator and a lead activator. Such activation is effected by heat-treating the oxide compounds with the two agents, copper and lead, under conditions which prevent reduction of the oxides. The product of the heat treatment is an infrared-stimulable phosphor comprising a double oxide of calcium with at least one of the elements aluminum, molybdenum, silicon, tin, titanium or vanadium, activated by both copper and lead.

According to one specific and preferred embodiment of my invention, I intimately commingle in dry or wet state substantially chemically-equivalent amounts of calcium oxide and an oxide of the other element desired to be associated therewith, or compounds of such materials which on heating and/or oxidizing will produce the oxides; I add thereto a copper activator and a lead activator, and heat the mixture under non-reducing or oxidizing conditions at a temperature of at least 800° C. and preferably between 800° C. and 1300° C. This calcination treatment results in an infrared-sensitive phosphor consisting essentially of a calcium compound such as, for example, calcium aluminate, calcium molybdate, calcium silicate, calcium stannate, calcium titanate or calcium vanadate, activated with copper and lead.

The oxidic compounds which are useful in my invention are those of calcium with the aforementioned elements aluminum, molybdenum, silicon, tin, titanium or vanadium, or mixtures thereof. Such compounds are really "double oxides"; and, although perhaps more correctly designated, e. g., $3CaO.Al_2O_3$, $2CaO.SiO_2$, etc., are popularly referred to as "calcium aluminate," "calcium silicate," and the like. Any compounds may be employed as raw materials provided they produce such double oxides after the contemplated heating and/or oxidation. Thus, a calcium oxide, such as lime or a per-oxide, and the oxide of the desired second element may be used, or their carbonates (yielding gaseous $CO_2$ and the oxides on calcination), or their chlorides or the like. It is essential, to achieve the desired infrared sensitivity of my invention, that the base material comprise a double oxide of calcium with one or more of these specifically-noted second elements.

It is also important to the success of my invention that such special base materials be activated with the particular pair of agents hereinbefore mentioned, namely, copper and lead. The complete absence of one or both of such activators will be disastrous to infrared activity. The particular concentrations of these two substances are frequently determinative of the quality of the product. Those quantities which are generally useful to insure activation are commonly denominated "activator amounts." For instance, the base material should usually be treated with between 0.0001 and 0.01% by weight of copper and with between 0.03 and 3.0% by weight of lead; and it will often be found that preferred ranges of concentrations comprise 0.0005 to 0.005% of copper and 1.0 to 3.0% of lead. It is relatively unimportant what form of such activators is utilized, the only requisite being that the copper and lead become intimately incorporated in the base material. Hence, although the activating agents are generally referred to in the art and in this specification simply as the elements, it should be understood that they are usually in fact employed in the form of some chemical compound. Essentially any of their oxides or organic or inorganic salts can be used, such as their sulphates, nitrates, chlorates, chlorides, acetates, and the like.

As previously mentioned, these activators and the double oxide base material must be intimately mixed, and any procedure which effectuates this is satisfactory. For example, the activators and the base may be commingled in the dry state, or the activators in the form of water-soluble salts may be added in solution and milled with the base to form a paste. The phosphor material must be heat-treated after these activating agents have been incorporated therewith, in order to develop the desired infrared sensitivity. To effectuate this, temperatures of at least 800° C. and up to about 1300° C. should generally be used, depending upon the time of treatment, the character of the materials employed, and similar factors; and between 1050° C. and 1150° C. is often a satisfactory or preferred range. Since one is working with oxidic compounds, it is also important that these be protected from reduction during such calcination; hence, there should be a non-reducing atmosphere within the heating chamber during the treatment.

The double oxide of calcium with aluminum or molybdenum or another of the chosen elements or mixtures thereof may be first prepared by known means, and the two activators copper and lead subsequently added thereto and the mixture calcined. However, it is frequently more practical in commercial operation to commingle those compounds of calcium and the second element which are to produce the double oxide, and to add the two activating agents at the same time; then one and the same heat treatment will serve both to form the desired double oxide and to activate it. When compounds of calcium and the second element are employed which require oxidation to produce the double oxide, naturally the atmosphere within the heating chamber must not only be non-reducing, it must in fact serve as an oxidizing medium. For such purposes, air or oxygen may be utilized. Depending upon the other conditions prevailing, the particular raw materials employed, the temperature of calcination and such factors, the time of heat treatment may vary considerably, say, from fifteen minutes to several hours; however, between one-half and two hours will often be found sufficient to form the desired double oxide from its raw materials and/or to activate the same. The use of a fluxing agent to aid in calcination may be resorted to, if desired; however, unlike the prior art processes for preparing phosphors, such agents do not often provide material advantage.

The ensuing examples are given simply to illustrate my invention and not in any way to limit its scope:

Example I

The following materials were thoroughly milled together and allowed to dry: 23.25 parts by weight of $CaCO_3$ (to yield 13.03 parts of CaO), hydrous silica containing 6.97 parts by weight of $SiO_2$, 0.8784 part of $PbSO_4$ (0.6 part of Pb itself) and 0.0002 part of Cu in the form of a dilute $CuSO_4$ solution. This mixture was calcined in a silica crucible at 1100° C. for 30 minutes, using air as the oxidizing atmosphere. The product was a white powder comprising a calcium silicate phosphor and having a purple infrared phosphorescence which was relatively short-lived. Such phosphorescence was determined after excitation of the powder by exposure for 10 seconds to a low-pressure mercury lamp with no filter (containing some 1850 Å radiation). After such excitation, the material was irradiated with infrared radiation from a 100-watt tungsten lamp equipped with a filter to remove visible light.

Example II 19.95 parts by weight of $CaCO_3$ and 8.82 parts of $V_2O_5$ were mixed and calcined to produce calcium vanadate. This double oxide was then treated with 0.01% by weight of copper and 3.0% by weight of lead and fired for 45 minutes at 1050° C. in a non-reducing atmosphere. The product was a pale orange-yellow, and after due excitation exhibited pink infrared phosphorescence.

Example III 12.45 parts by weight of CaO and 7.55 parts of $Al_2O_3$ were mixed together and milled into a paste with the addition of water solutions of $Cu(NO_3)_2$ (0.009% of Cu by weight of the base material), and of $Pb(NO_3)_2$ (yielding 2.0% Pb by weight of the base). This paste was dried at 105° C. and then heat-treated for 1½ hours in air at 1000° C. The product was a calcium aluminate phosphor, infrared-stimulable like the products of Examples I and II.

Example IV

A calcium molybdate phosphor was prepared by mixing 10.78 parts by weight of CaO and 9.22 parts of $MoO_3$, and adding to the mixture 0.005% by weight of Cu and 2.5% by weight of Pb. This mix was calcined for one hour at 1100° C., producing the aforementioned infrared-sensitive calcium molybdate, $3CaO.MoO_3$.

As previously discussed, the new process of my invention provides a novel class of infrared-stimulable phosphors, which have properties now desired for many uses: namely, relatively weak phosphorescence and relatively short energy-storage periods. Prior experimenters knew of only a few oxy-compounds which were infrared-sensitive, and deemed the various metal sulphides or selenides to be the usual I. R. phosphors of commerce. However, I have now provided means whereby a new group of such phosphors may be readily prepared, and from base materials which are generally well-known oxy-compounds.

I claim as my invention:

1. A process for the production of an infrared-sensitive phosphor which comprises heating together in an oxidizing atmosphere, at temperatures ranging from 800° C.–1300° C. and until infrared sensitivity is developed, from 0.0001 to 0.01% by weight of copper, between 0.03% and 3.0% by weight of lead, and an oxide of calcium with a stoichiometric proportion of a compound selected from the group consisting of an oxide of an element from the group aluminum, molybdenum, silicon, tin, titanium and vanadium, and a compound of said elements which yields an oxide during said heating.

2. An infrared-stimulable phosphor consisting essentially of a calcium compound selected from the group consisting of calcium aluminate, calcium molybdate, calcium silicate, calcium stannate, calcium titanate and calcium vanadate, activated with from 0.0005 to 0.005% by weight of copper and between 1.0 and 3.0% by weight of lead.

3. An infrared-stimulable phosphor consisting essentially of calcium aluminate activated with between 0.0001 and 0.01% by weight of copper and from 0.03 to 3.0% by weight of lead.

4. An infrared-stimulable phosphor consisting essentially of calcium silicate activated with between 0.0001 and 0.01% by weight of copper and from 0.03 to 3.0% by weight of lead.

5. An infrared-simultable phosphor consisting essentially of calcium molybdate activated with between 0.0001 and 0.01% by weight of copper and from 0.03 to 3.0% by weight of lead.

6. A process for the production of an infrared-sensitive phosphor which comprises intimately mixing substantially chemically equivalent amounts of an oxide of calcium with a compound selected from the group consisting of an oxide of an element from the group aluminum, molybdenum, silicon, tin, titanium and vanadium, and a compound of said elements which breaks down on heating to form an oxide of said elements, between 0.0001 and 0.01% by weight of copper and between 0.03 and 3.0% by weight of lead, and heat-treating said mixture under oxidizing conditions at a temperature of from 800° C. to 1300° C. and continuing said heating until infrared sensitivity is developed.

7. A process for the production of an infrared-sensitive phosphor which comprises heating together, at a temperature of between 800° C. and 1300° C. and under non-reducing conditions, an intimate mixture of substantially chemically equivalent amounts of calcium oxide, an oxide of an element selected from the group consisting of aluminum, molybdenum, silicon, tin, titanium and vanadium, from 0.0001 to 0.01% by weight of copper activator and between 0.03 and 3% by weight of lead activator, and continuing said heating until desired infrared sensitivity is developed in the resulting reaction product.

8. A process for the production of an infrared-sensitive phosphor which comprises mixing together substantially chemically equivalent amounts of calcium oxide and a compound selected from the group consisting of an oxide and a compound of an element from the group consisting of aluminum, molybdenum, silicon, tin, titanium and vanadium, said latter compound being capable on oxidation of yielding the corresponding oxide, adding to said mixture between 0.0001 and 0.01% by weight of copper activator and between 0.03 and 3.0% by weight of lead activator, and simultaneously oxidizing and activating the mass by heating the same in an oxidizing atmosphere at between 800° C. and 1300° C. until infrared sensitivity is developed in the resulting reaction product.

9. A method for producing an infrared-sensitive phosphor which comprises intimately mixing substantially stoichiometric proportions of an oxide of calcium with a compound selected from the group consisting of an oxide of an element selected from the group consisting of aluminum, molybdenum, silicon, tin, titanium and vanadium and a compound of said elements which on oxidation yields the corresponding oxide, adding to said mixture between 0.0005 and 0.005% by weight of copper and from 1.0 to 3.0% by weight of lead, and heating the resulting mixture in a non-reducing atmosphere at temperatures ranging from 1050–1150° C. until infrared sensitivity is developed.

DONALD W. LYON.

REFERENCES CITED

The following references are of record in the file of this patent:

UNITED STATES PATENTS

| Number | Name | Date |
| --- | --- | --- |
| 2,447,322 | Fonda | Aug. 17, 1948 |
| 2,462,547 | Pitha | Feb. 22, 1949 |
| 2,470,451 | Wood | May 17, 1949 |
| 2,522,074 | Urbach | Sept. 12, 1950 |